US009752677B2

(12) United States Patent
Fernandez

(10) Patent No.: US 9,752,677 B2
(45) Date of Patent: Sep. 5, 2017

(54) DAMPERS AT THE MAIN SHIFT ROD

(71) Applicant: Eaton Corporation, Cleveland, OH (US)

(72) Inventor: Josevaldo R. Fernandez, Buarulhos (BR)

(73) Assignee: Eaton Corporation, Cleveland, OH (US)

( * ) Notice: Subject to any disclaimer, the term of this patent is extended or adjusted under 35 U.S.C. 154(b) by 191 days.

(21) Appl. No.: 14/661,305

(22) Filed: Mar. 18, 2015

(65) Prior Publication Data

US 2015/0192204 A1    Jul. 9, 2015

Related U.S. Application Data

(63) Continuation of application No. 13/670,449, filed on Nov. 6, 2012, now Pat. No. 9,021,909.

(Continued)

(51) Int. Cl.

| F16H 59/04 | (2006.01) |
|---|---|
| B60K 20/00 | (2006.01) |
| F16H 61/26 | (2006.01) |
| F16H 59/02 | (2006.01) |
| F16H 61/24 | (2006.01) |
| F16H 63/20 | (2006.01) |

(Continued)

(52) U.S. Cl.
CPC ............. *F16H 61/26* (2013.01); *F16D 23/06* (2013.01); *F16H 59/02* (2013.01); *F16H 59/0208* (2013.01); *F16H 61/0403* (2013.01); *F16H 61/24* (2013.01); *F16H 63/20* (2013.01); *F16H 63/3069* (2013.01); *F16D 2023/0618* (2013.01); *F16D 2023/0625* (2013.01); *F16D 2023/0656* (2013.01); *F16H 2063/3076* (2013.01); *F16H 2063/3079* (2013.01); *Y10T 74/19251* (2015.01); *Y10T 74/19284* (2015.01)

(58) Field of Classification Search
CPC ................. F16H 2059/0282; F16H 2059/2086
USPC ............ 74/325, 339, 473.24, 473.25, 473.36
See application file for complete search history.

(56) References Cited

U.S. PATENT DOCUMENTS

| 4,060,005 A | 11/1977 | Bost |
|---|---|---|
| 4,633,725 A | 1/1987 | Jones |

(Continued)

FOREIGN PATENT DOCUMENTS

| CN | 1174301 A | 2/1998 |
|---|---|---|
| CN | 101240843 A | 8/2008 |

(Continued)

OTHER PUBLICATIONS

English Abstract for CN101240843A.

(Continued)

*Primary Examiner* — Ha D Ho
(74) *Attorney, Agent, or Firm* — Fishman Stewart PLLC

(57) ABSTRACT

A compound transmission shift mechanism is disclosed. The shift mechanism includes a plurality of gears configured on at least one transmission shaft with at least one synchronizer configured to engage at least two of the plurality of gears. The shift mechanism includes a control system configured to engage and position the synchronizer into alignment with the at least two of the plurality of gears. Additionally, the shift mechanism includes at least one damping assembly configured on the control system and operatively connected to the synchronizer.

20 Claims, 5 Drawing Sheets

Related U.S. Application Data

(60) Provisional application No. 61/708,322, filed on Oct. 1, 2012.

(51) Int. Cl.
*F16H 61/04* (2006.01)
*F16D 23/06* (2006.01)
*F16H 63/30* (2006.01)

(56) References Cited

U.S. PATENT DOCUMENTS

| | | | |
|---|---|---|---|
| 5,231,895 A * | 8/1993 | Stine | F16H 59/70 74/335 |
| 5,450,767 A | 9/1995 | Willford et al. | |
| 5,517,876 A | 5/1996 | Genise et al. | |
| 5,566,579 A | 10/1996 | Willford et al. | |
| 5,927,146 A | 7/1999 | Dutson | |
| 5,941,126 A | 8/1999 | Hirsch et al. | |
| 6,000,294 A | 12/1999 | Jackson et al. | |
| 6,035,738 A | 3/2000 | Huggins et al. | |
| 7,509,885 B2 | 3/2009 | Gerlofs et al. | |
| 7,861,612 B2 * | 1/2011 | Jeng | F16H 61/702 477/125 |
| 9,021,909 B2 * | 5/2015 | Fernandez | F16H 59/0208 74/339 |
| 2008/0173120 A1 | 7/2008 | Ciamillo | |

FOREIGN PATENT DOCUMENTS

| | | |
|---|---|---|
| DE | 2935590 C2 | 4/1983 |
| DE | 19956528 A1 | 5/2000 |
| DE | 102005048300 A1 | 4/2007 |
| DE | 102008060364 A1 | 6/2010 |
| EP | 814282 A2 | 12/1997 |
| GB | 2487413 A | 7/2012 |

OTHER PUBLICATIONS

English Translation for Chinese Office Action for App. No. 201380051241.2.
English Abstract for DE2935590C2.
International Search Report for PCT/US2013/062601 dated Mar. 12, 2013.
English Abstract for DE102005048300A1.
English Abstract for DE19956528A1.
English Abstract for DE102008060364A1.

* cited by examiner

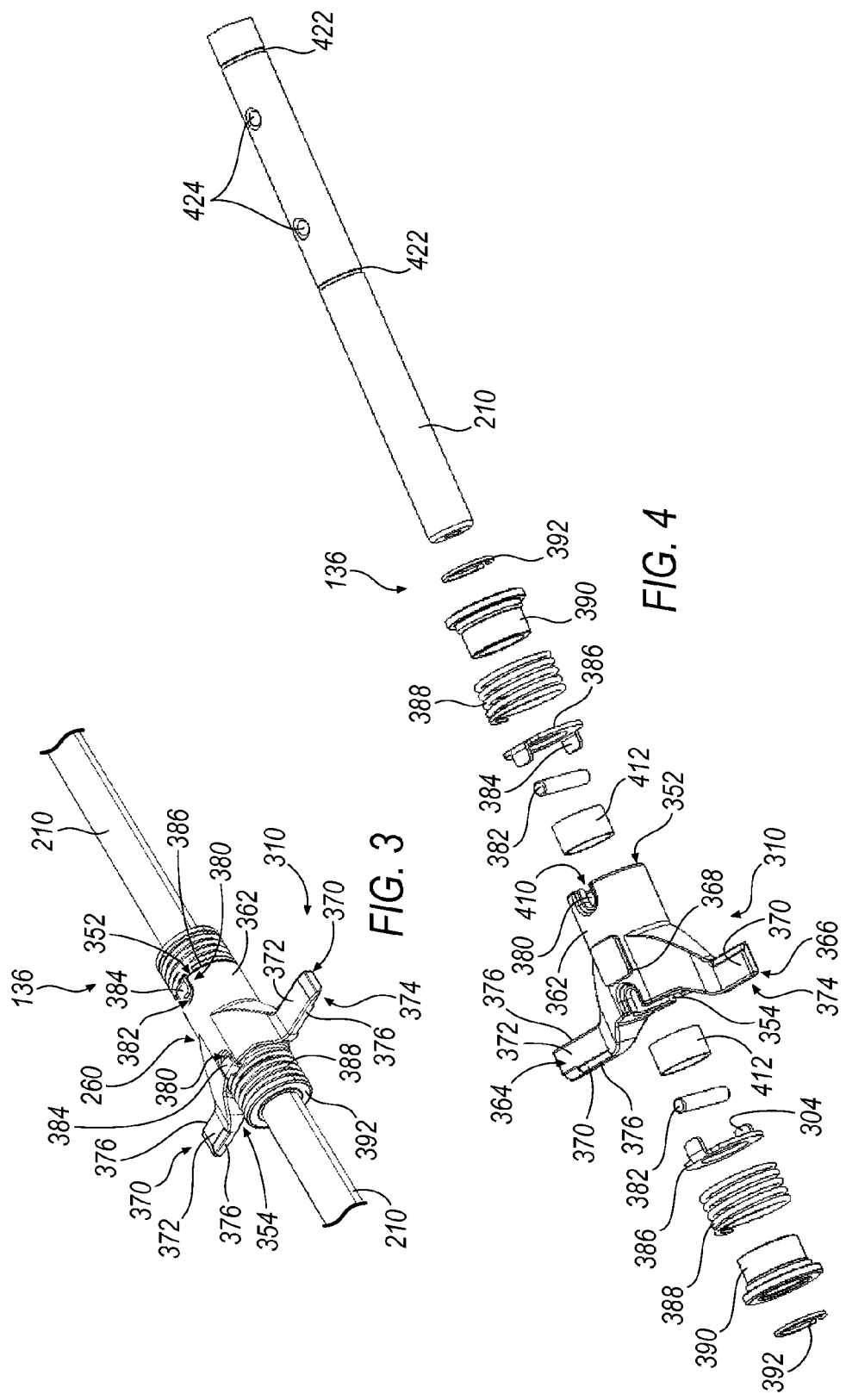

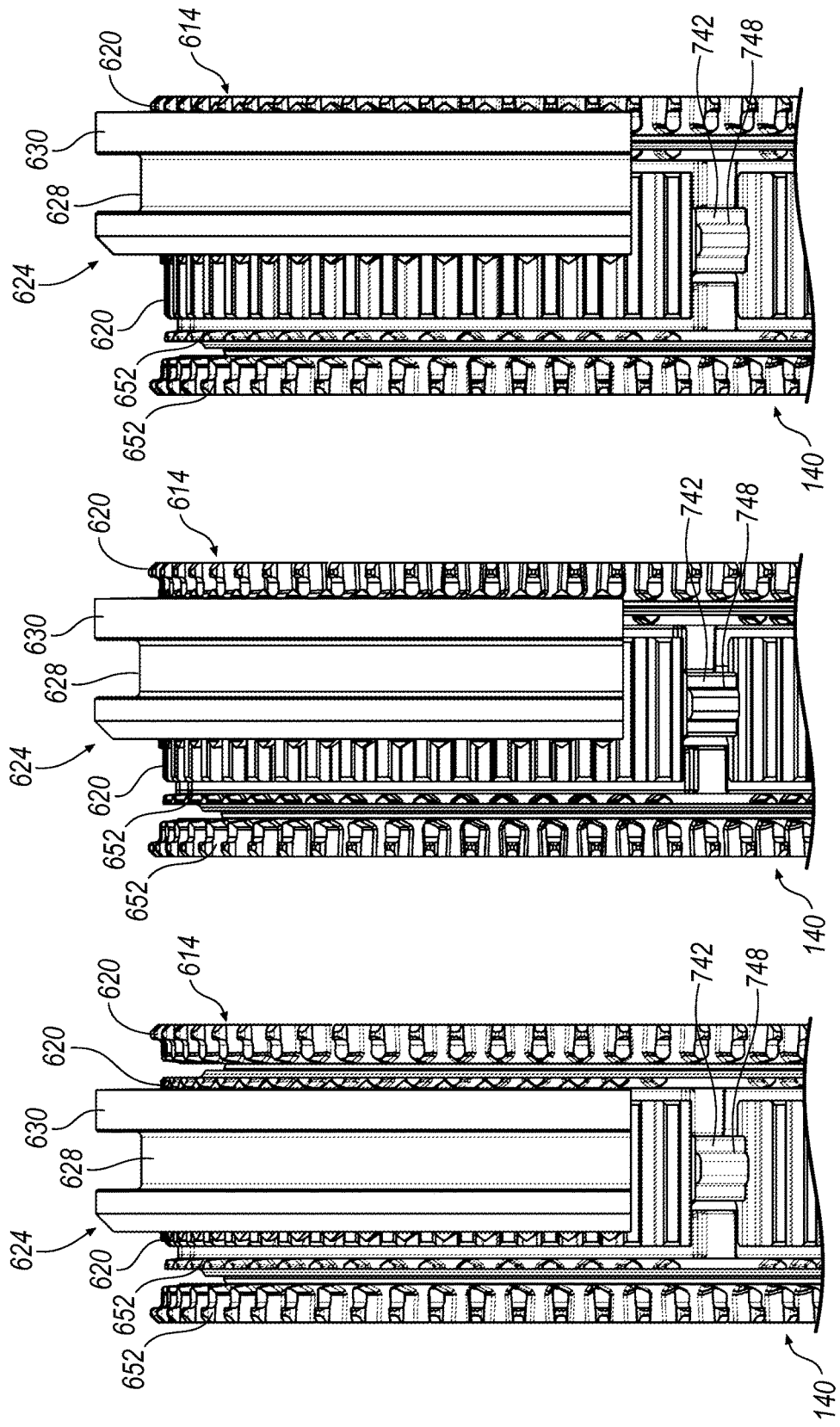

DAMPERS AT THE MAIN SHIFT ROD

CROSS-REFERENCE TO RELATED APPLICATIONS

This application is a continuation of and claims the benefit of U.S. patent application Ser. No. 13/670,449 filed on Nov. 6, 2012, which claims priority to Provisional Application Ser. 61/708,322 filed on Oct. 1, 2012, which is incorporated by reference in its entirety.

TECHNICAL FIELD

The technical field is generally related to multi-rail shifting mechanisms of manual compound transmissions, and particularly, a gear selection system within the manual compound transmission.

BACKGROUND

Manual compound transmissions are used for various vehicle applications. Such compound transmissions typically comprise a multiple speed main section containing a plurality of gears for various range and load gearing configurations.

Manual compound transmissions are generally positioned within a driveline adjacent a primary drive unit with at least one rotating drive shaft. These compound transmissions generally include a shifter or gear selector that extends from the transmission for interaction with an operator. The compound transmission may include a rotating and sliding assembly that is configured to engage a desired gear set when an operator moves the shifter or gear selector. Specifically, in a manual compound transmission an operator, through the gear selector, selects an appropriate gear by pushing or pulling the shift lever to a desired shift gate. A rail selector fixed to the main shift rail is configured to translate the movement of the shift lever to the shift forks. The rail selector is fixed to the main shift rail by a roll pin that extends through a central location of the rail selector. The action on the shift lever causes a set of shift rails to move at least one shift fork, which causes a shift collar to slide over the appropriate rotating gear to synchronize and activate a desired gear range.

Shift quality is an important factor for manual compound transmissions when selecting the desired gear range. There are many factors affecting shift quality, such as, but not limited to shift force, notchness from bumps and detents, nibble, and precision of the rotating and sliding components, such as, but not limited to end stop feel and lash. Nibble may be defined as a form of partial clash following a successful synchronizing action. It may result from a speed differential generated during the period between indexing and final engagement of the teeth for the desired gear. Unfortunately, the previously discussed factors affecting shift quality are typically transmitted directly through the rotating components and shift rails, as the previous designs included shift components that were fixed directly to the shift rail. These factors are transmitted directly through the components, through the shift lever and ultimately to the operator.

The shift quality is important to provide the operator with the appropriate feedback through the shift lever indicating that the compound transmission is engaged in the appropriate gear set while preventing a mis-shift or other misalignment that may potentially damage or shorten the life of the transmission. The shift quality is also important for preventing fatigue and possible injury to the operator as the feedback carried through the shift lever may result in damage to the operators hand, wrist, arm or shoulder.

Therefore, it is desirable to provide a manual compound transmission system that allows for improved synchronization of the meshing components, while providing an additional damping mechanism to improve shift quality and an operator's shifting experience, thereby providing a smooth end stop feel preventing operator fatigue and providing prolonged transmission life.

SUMMARY

The present disclosure relates to shift quality for manual compound transmissions. Manual compound transmissions include a shift lever interconnected with at least one shift rail for moving a shift rail, which engages a plurality of shift rings for engaging at least one gear. An exemplary shift mechanism may be configured to filter out or remove at least two well known phenomenon known as notchness created when the shift mechanism engages the forks and nibble created when the shift ring synchronizes with the at least one gear, which both may be felt in the shift lever.

An exemplary shift mechanism may also be configured to provide a smooth end stop feel when the operator selects a specific gear. The shift mechanism may include a shift rail configured with at least one rail selector. The rail selector may be positioned longitudinally on the shift rail with at least one damping member configured on the shift rail adjacent at least one of a leading edge of the rail selector and trailing edge of the rail selector. The rail selector may be locked into place on the shift rail by any known method. Specifically, the rail selector may be prevented from sliding for or aft on the main shift rail with at least one stop pin and at least one tab washer.

Additionally, the shift mechanism may include an improved synchronization feature to aid in the prevention of nibble during gear selection. The improved synchronization feature may include a springing mechanism a spring is retained on a shift rail with at least one snap ring configured outboard of the spring. The shift mechanism may include a sliding sleeve that when moved aside it pushes, via a strut or pre-energizer, a blocker ring against a targeted gear. The blocker ring rotates (due to friction) till meeting the wall of a fixed hub window when pushed against a gear cone. At this position engagement chamfers are aligned to the chamfers of the sliding sleeve where a synchronization phase starts with the chamfers indexed/aligned. Once the synchronization is completed, the blocker ring and the sliding sleeve are meshed (via the chamfers). The shift mechanism releases the sliding sleeve for advancing toward the targeted gear. The sliding sleeve and gear cone spline hit each other and again the splines are meshed due to the action of engagement chamfers and then the engagement is completed.

BRIEF DESCRIPTION OF THE DRAWINGS

FIG. 3 is a perspective view of an enlarged shift rail damper assembly configured on a main shift rail;

FIG. 4 is an exploded perspective view of an exemplary shift rail damper system;

FIG. 9 illustrates a top view of an exemplary synchronizer in a meshing position;

FIG. 10 illustrates a top view of an exemplary synchronizer in a partially engaged position; and FIG. 11 illustrates a top view of an exemplary synchronizer in an engaged position.

DETAILED DESCRIPTION

Figure 1:
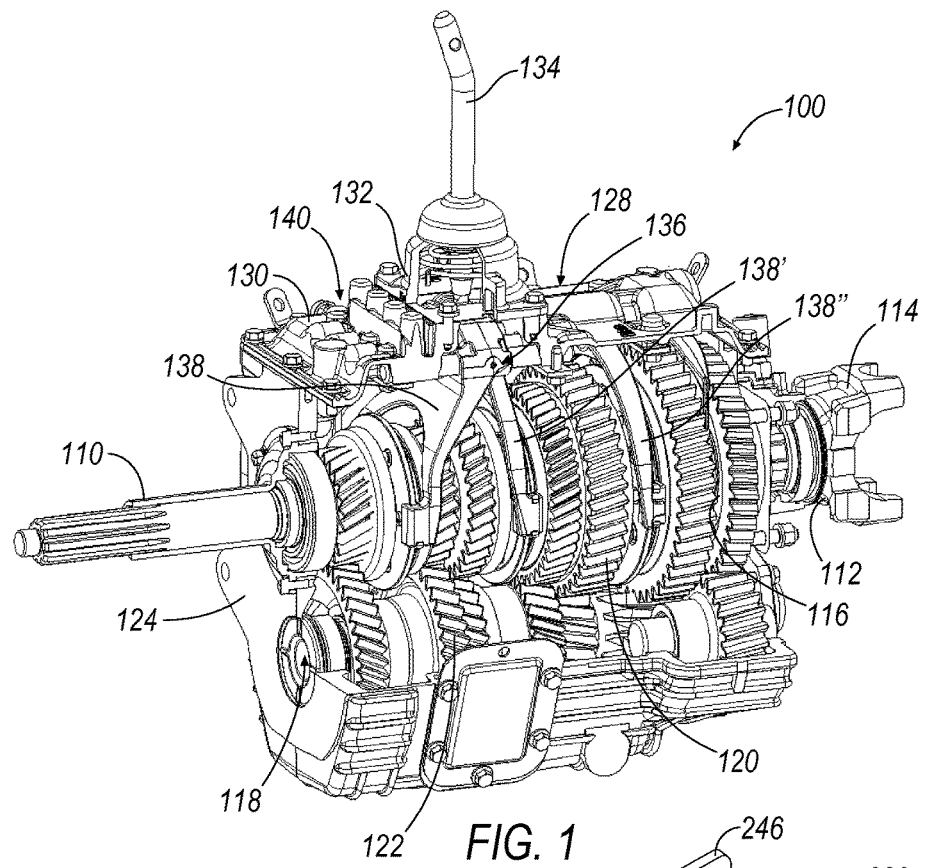
FIG. 1 is a perspective view, not to scale, of a compound manual transmission with the case partially torn away.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

Reference in the specification to "an exemplary illustration" and "example" or similar language means that a particular feature, structure, or characteristic described in connection with the exemplary approach is included in at least one illustration. The appearances of the phrase "in an illustration" or similar type language in various places in the specification are not necessarily all referring to the same illustration or example.

According to various exemplary illustrations described herein, a system and method are disclosed. Specifically, an exemplary shift mechanism for a compound manual transmission is disclosed. The compound manual transmission includes an input shaft and an output shaft, the input shaft may be configured to engage a prime mover (not shown), while the output shaft may include a yoke for engaging a drive member (not shown). The compound manual transmission includes a main shaft, a countershaft and a plurality of gears configured with in the transmission housing. The main shaft may be configured between the input shaft and the end yoke, which may be configured at a rear of the compound manual transmission. The main shaft may include a first plurality of gears configured about the main shaft and in rotative alignment with a second plurality gears configured on the countershaft. The shafts and gears are typically referred to as the rotating assembly.

A shift lever may extend from a control tower configured on a shift bar housing, which may be attached to an upper section of the compound transmission housing. The shift bar housing may be configured to position at least one shift rail in proximity to the rotating assembly, thereby slidably connecting the shift lever and at least one shift fork to the rotating assembly. The at least one shift rail may be configured with at least one damping element for the reduction or elimination of notch, nibble or other issue that may create poor shift quality. The damping element may be in the form of a spring, a low friction bushing, linear ball bearing or other known damping element that may be configured on the at least one shift rail. The connection between the shift lever and the rotating assembly allows for an operator to select a desired gear set as the lever may be directly connected to the gears within the compound transmission. The at least one shift rail, discussed in greater detail below, may include a rail selector and the at least one damping element configured on a main shift rail of the at least one shift rail. Through movement of the at least one shift rail, the shift fork may engage at least one synchronizer, discussed in greater detail below, for meshing the selected gear set, which helps to prolong the life of the compound transmission and minimize nibble that may be associated with gear changing.

The rotating assembly, which includes the input shaft, main shaft, countershaft and synchronizer, may be configured to transmit torque from the prime mover to the output yoke through the desired gear set. The main shaft may include a plurality of splined teeth that may be configured to engage a fixed hub of the synchronizer and ultimately the plurality of gears on the counter shaft, which may be driven by the input shaft. The synchronizer may include at least one gear flange, at least one blocker or synchronizer ring, the fixed hub, a sliding sleeve and a pre-energizer component. The flange, blocker, ring and hub all include teeth or cogs cut into an outer diameter surface of each and these teeth are configured to engage and mesh with corresponding teeth or cogs that are cut into an inner diameter surface of the sliding sleeve. The teeth each have engagement chamfers that aid in the alignment with corresponding chamfers on the sliding sleeves teeth. Thus, in operation, when the chamfers are indexed/aligned, a synchronization phase starts. Additionally, the pre-energizer component may include at least one of a strut, a roller, a plunger and a spring.

When the sliding sleeve moves aside it pushes, via the strut or pre-energizer, the blocker ring against the targeted gear. When pushed against a desired gear cone, the blocker ring rotates (due to friction) until meeting a wall of the fixed hub. At this position, an engagement chamfer may be aligned to a chamfer configured on the teeth of the sliding sleeve. Thus, with the chamfers indexed/aligned, synchronization starts. Once completed, the synchronization, blocker ring and sliding sleeve are meshed (via chamfers), which releases the sliding sleeve for advancing toward the gear. The sliding sleeve and gear cone spline hit each other and again the splines are meshed due to the action of engagement between the chamfers, thereby completing the engagement. Thus, in operation, and operator positions the shift lever to select a predetermined gear set. The gear selection occurs by maneuvering the shift lever to slide the main shift rail, thereby connecting the shift rail with the synchronizer and ultimately the gears. The rail selector provides a linear force that pushes or pulls the shift fork, thereby sliding at least a portion of the shift fork against an outer engagement groove on the outer diameter of the sliding sleeve to synchronize and engage the desired gear set.

Referring to FIG. 1 a compound manual transmission 100 is illustrated. The transmission 100 may comprise an input shaft 110 and an output shaft 112, the input shaft 110 may be configured to engage a prime mover (not shown), while the output shaft 112 may include a yoke 114 for engaging a driven member (not shown). The compound manual transmission 100, discussed in greater detail below, includes an output shaft main shaft 116, a countershaft 118 and a plurality of gears 120, 122 configured about the shafts 116, 118. The main shaft 116 and the countershaft 118 are configured within the transmission housing 124 between and engagement with the input shaft 110 configured to extend forward of the transmission housing 124 and the end yoke 114 configured to extend aft of the transmission housing 124. The main shaft 116 may include a first plurality of gears 120 configured about the main shaft 116 and rotatably aligned with a second plurality of gears 122 configured on the countershaft 118. The input shaft 110, the output shaft 112, the main shaft 116 and the countershaft 118 may be supported by the housing 124 through a plurality of bearings 126. The main shaft 116 may include at least one synchronization unit or synchronizer 140 (discussed in greater detail below) for engaging a predetermined output speed.

With continued reference to FIG. 1, an upper housing portion 128 may be configured to receive a shift bar housing 130. Additionally, a control tower 132 extends from the shift bar housing 130 to a shift lever 134. The control tower 132 may include a cross joint with axial adjustment elements to increase shift selection while reducing any free play in the shift lever 134. The shift bar housing 130 may be configured to retain and align a gear change control system 136. The control system 136 may be configured to translate movement from the shift lever 134 to at least one shift fork 138 to select a desired gear set from the plurality of gears 120, 122 for determining the predetermined output. Additionally, the shift fork 138 may be configured to engage at least a portion the synchronizer 140 for selecting the predetermined gear set, discussed in greater detail below.

Figure 2:
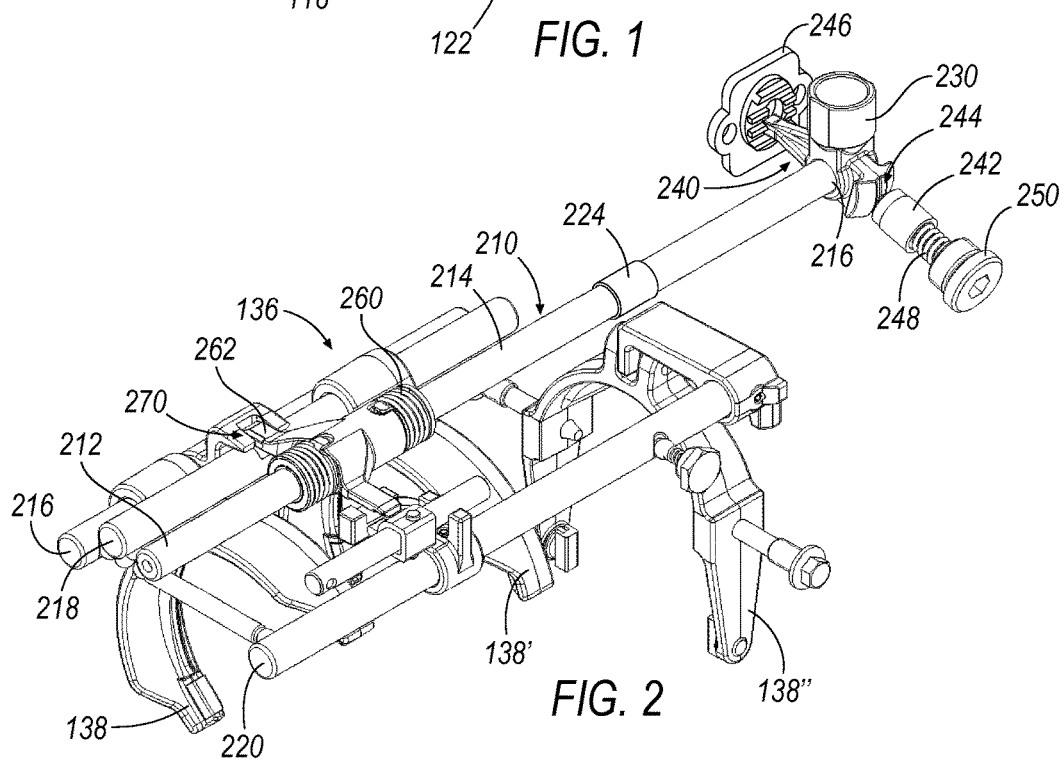
FIG. 2 is a perspective view of an exemplary shift rail damper system for a compound manual transmission.

FIG. 2 illustrates a detail view of the control system 136, which may include at least one main shift rail 210. The main shift rail 210 may include a first end portion 212, a mid-portion 214 and a second end portion 216. As illustrated, the control system includes a plurality of shift rails. Specifically, a second shift rail 218, a third shift rail 220 and a fourth shift rail 222. However, this illustration is merely an example and any number of shift rails may be used. Additionally, each shift rail 216, 218, 220 may include a respective shift fork 138, 138', 138", as will be discussed in greater detail below. The main shift rail 210 may include an engagement mechanism 230 and a rail selector damping assembly 260, which will be discussed in greater detail below.

The engagement mechanism 230 may be used for interconnecting the shift lever 134 with the main shift rail 210. The engagement mechanism 230 may be configured on either the main shift rail first end 212 or the main shift rail second end 216 depending on the particular position of the control tower 132. The engagement mechanism 230 may be configured to receive an end of the shift lever 134 and may include at least one adjustment mechanism 240. The at least one adjustment mechanism 240 may be configured on at least one side of the engagement mechanism 230 to aid in minimizing or eliminating free play while improving shift quality. Additionally, the control tower 132 may include a cross joint (not shown) to also help with increasing gear selection while reducing or eliminating the free play. The adjustment mechanism 240 may include one of a spring biasing member or detent plunger 242 configured to bias travel of the engagement mechanism 230 to improve shift definition and reduce free play of the shift lever 134, and a bias plate 246 having grooves and channels replicating a bias pattern for shift lever travel allowing the engagement mechanism 230 to maintain a defined shift pattern, which improves shift definition and reduces or eliminates free play.

Additionally, the detent plunger 242 may include a biasing member 248 and a bushing 250. The biasing member 248 may be a spring, elastomer or other known biasing device configured between the detent plunger 242 and the bushing 250 or other fixed point. It has been found that the length of the detent plunger 242 and a detent ramp 244 may improve snap-in shift, while reducing lever play. A snap-in shift means that instead of the drive to push the lever to complete the engagement, in some phases of the shift the shift lever pushes the hand of the driver, as if the lever automatically completed the shift itself. The detent ramp 244 may be configured having an indented center section with outwardly sloped ramps, which are sloped at a predetermined angle of approximately 23° to 26°, such that the ramps slope upward to the indented centered section, as illustrated in FIG. 2. However, it should be realized that other ramp sizes and shapes may be used to provide a positive engagement with the detent plunger 242. Through extensive testing it has been shown that the detent plunger 242, may have a rounded protrusion that is configured engage the indented center section of the detent ramp 244. Additionally, the detent plunger 242 may have a length of approximately 25 mm to 40 mm with an optimum range of approximately 30 mm to 35 mm, which has shown to greatly reduce lever play to aid in reducing operator fatigue.

At least one of the main shift rail 210, the second shift rail 218, the third shift rail 220 and the fourth shift rail 222 may be slidably configured in the shift bar housing 130. The shift rails 210, 218, 220, 222 may include at least one anti-friction element 224, which may provide additional improvements for snap-in while helping to reduce or eliminate the notchness when the rails 210, 218, 220, 222 slide in the housing 130. The anti-friction element 224 may be, but is not limited to, a lubricative coating (Teflon), a bushing, a linear ball bearing, a roller bearing or other known anti-friction mechanism. The main shift rail 210 may be configured to receive at least one rail selector damping assembly 260. As illustrated, a single rail selector damping assembly 260 is configured substantially at the mid-portion 214 of the main shift rail 210. However, the number and position of the rail selector damping assembly 260 is not limited to a single assembly or to one specific area. Thus, the rail selector damping assembly 260 may be configured anywhere along the main shift rail 210, as required by a specific manual transmission 100 design. As illustrated, the rail selector damping assembly 260 includes at least one engagement portion 262 that is configured to engage at least one connection element 270 configured adjacent to the shift rails 218, 220, 222. The engagement between the connection element 270 and the engagement portion 262 allows the main shift rail 210 to be operatively connected with at least one of the second shift rail 218, the third shift rail 220 and the fourth shift rail 222.

The rail selector damping assembly 260 may be of any dimension and shape fitting within the foot print of the shift bar housing 130. The rail selector damping assembly 260 may be configured to translate movement from the shift lever 134 through the main shift rail 210 and through the shift forks 138, 138', 138" to select a desired gear set. Additionally, the shift forks 138, 138', 138" may be configured to connect directly to the respective shift rail 210, 218, 220, 222 or through direct engagement with the connection element 270. Thus, as discussed above, the control system 136 operatively connects the shift lever 134 to the gears 120, 122 thereby providing a mechanism for the operator to select a predetermined gear set.

FIGS. 3 and 4 illustrate additional detail of the control system 136. Specifically, FIG. 3 illustrates a detailed view of the rail selector damping assembly 260, while FIG. 4 illustrates an exploded view of the rail selector damping assembly 310 prior to assembly onto the main shift rail 210. The exemplary rail selector damping assembly 260, as illustrated in FIG. 3, may be configured having a rail selector 310. The rail selector 310 may include a cylindrical main body 362 with a laterally extending first wing 364 and a laterally extending second wing 366. The first and second wings 364, 366 may be offset depending on the specific application and are not limited to any specific dimension or size. The wings 364, 366 are illustrated as being mirror images while projecting out from the main body 362 of the rail selector 310 along a common plane. The wings 364, 366 taper from a main body outer surface 368 outwardly to an engagement area 370. The exemplary engagement area 370 is configured as having a generally flat upper surface 372 and a notched bottom surface 374, the engagement area 370 may include generally flat sides 376. The exemplary rail selector 310 configuration allows the main shift rail 210 to engage at least two connection elements 270 simultaneously. However, the illustrated configuration is not limiting, and any known shape may be used for the rail selector 310, such that the configuration may transmit movement from the shift lever 134 to the at least one shift fork 138, 138', 138".

The main body 362 of the rail selector 310 may also include at least one mounting recess 380 extending perpendicularly through at least a portion of one of the first rail selector end 352 and the second rail selector end 354. The mounting recess 380 may be a cutout for receiving a stop pin 382, which stops the rail selector 310 in a predetermined position on the main shift rail 210. The mounting recess 380 is configured to provide clearance around the stop pin 382, which allows the rail selector 310 to slide longitudinally a predetermined distance to provide a damping effect. The stop pin 382 is slid through an aperture 424 (see FIG. 4) configured in the main shift rail 210 to engage the mounting recess 380. The stop pin 382 may be configured to prevent the rail selector 310 from rotating inadvertently about the main shift rail 210, thereby providing positive engagement with the connection elements 270. The stop pin 382 is positioned against a bushing or sliding element 412 (see FIG. 4) and is retained with at least one position tab 384 configured on a tab washer 386. The bushing 412 may be configured to support the rail selector 310 and provide a wear element that may allow the rail selector 310 to move without binding on the shift rail 210. As illustrated in FIG. 3, the rail selector damping assembly 260 also includes a damping element 388 configured adjacent the tab washer 386 and over at least a portion of a tab washer bushing 390. The tab washer 386, damping element 388 and tab washer bushing 390 are all retained longitudinally on the main shift rail by a retaining element 392. The retaining element 392 may be of any known shift rail retaining mechanism, such as, but not limited to a snap ring, a pin or other such element.

The damping element 388 is illustrated as a resilient spring element. However, the damping element 388 may be constructed of any resilient absorbing element, such as, but not limited to an elastomer, hydraulic or pneumatic cylinder, silicone, rubber and polymer. Additionally, the tab washer 386, bushing 383, tab washer bushing 390 and retaining element 392 are not limited to any known material and may be constructed from composite, rigid plastic, steel, aluminum, brass and bronze.

With specific reference drawn to FIG. 4, the main shift rail 210 is configured with at least two circumferential grooves 422 for receiving the retaining element 392 and at least two apertures 424, as discussed above. The exploded view of the rail selector damping assembly 260 shows the arrangement of how the rail selector damping assembly 260 is configured on the main shift rail 210. Thus, the rail selector damping assembly 260, as discussed above, may include at least one retaining element 392 slid onto the main shift rail 210 and seated in the circumferential groove 422. The retaining element 392 is not limited to being a removable element and may be a stop that is permanently fixed to the main shift rail 210. The tab washer bushing 390 is then slid onto the main shift rail 210 to abut the retaining element 392. Once the tab washer bushing 390 is put into place the damping element 388 and the tab washer 386 are slid onto the main shift rail 210, the damping element 388 is also slid over the tab washer bushing 390 and abuts a lip on the bushing 390 at one end and abuts the tab washer 386 at the opposing end. Once the tab washer 386 is positioned, the assembled elements are introduced to a predetermined pressure in the aft direction to compress the elements a predetermined distance to allow the stop pin 382 to be slid into the aperture 424. Once the stop pin 382 is in place the pressure is removed to allow the elements to expand in the fore direction, thereby applying a predetermined pressure against the stop pin 382 to prevent the stop pin 382 from sliding out of the aperture 424. The rail selector 310 may now be slid onto the main shift rail 210 and a duplicate set of elements may be configured in an opposing manner.

The rail selector 310 may include an internal sliding surface 410 that may include at least one sliding element 412. The sliding element 412 is illustrated as a low friction bushing configured between the rail selector inner surface 410 and the main shift rail 210. However, the sliding element 412 is not limited to a bushing and may be an anti-friction coating, a bearing or other such mechanism constructed of a material such as, but not limited to brass, aluminum or a composite material allowing the rail selector 310 to slide longitudinally on the main shift rail 210. When used, the sliding element 412 is slid over the main shift rail 210 to a predetermined location within the rail selector 310 to abut the stop pin 382.

As illustrated in FIG. 4 and discussed above, each element is duplicated both fore and aft of the rail selector 310 to provide damping in both directions. Specifically, the illustrated rail selector damping assembly 260 includes a forward stop pin 482 positioned in a forward aperture 426 and in a forward mounting recess 480 that is configured on the rail selector 310. A forward tab washer 486 having position tabs 484 is positioned to retain the forward stop pin 482 in place and a forward damping element 488 and a forward tab washer bushing 490 are positioned against the forward tab washer 486. Once the elements are assembled a predetermined amount of pressure is applied to compress the assembly thereby allowing a forward retaining element 492 to be positioned on the main shift rail 210 and into a forward circumferential groove 428. Once assembled, the rail selector damping assembly 260 becomes a cohesive unit with the main shift rail 210 to absorb and limit notchness and other shocks felt at the shift lever 134 by the operator when main shift rail 210 is moved either for or aft to the shift forks 138, 138', 138", synchronizer 140 and the first and second plurality of gears 120, 122, which results in improved shift quality.

Figure 5:
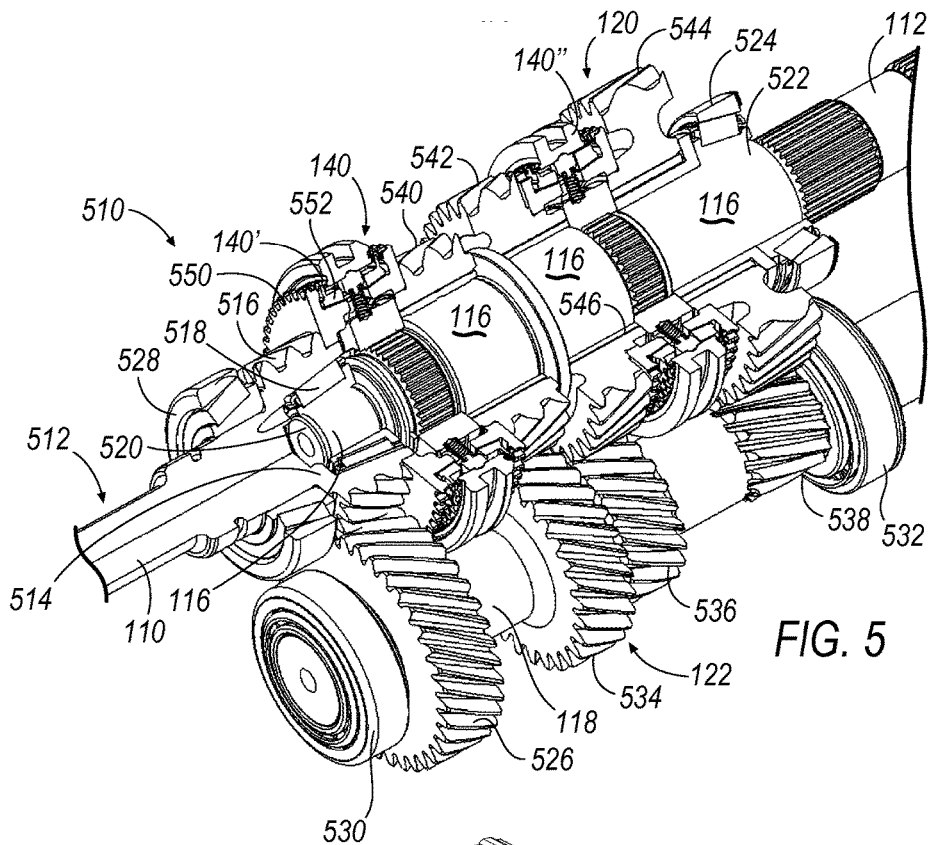
FIG. 5 is partial section view of an exemplary rotating assembly.

Turning now to FIG. 5, a rotating assembly 510 is illustrated. The rotating assembly 510 may include the input shaft 110 operatively connected to the output shaft 112 either directly or indirectly through the countershaft 118. The rotating assembly 510 may further include the first plurality of gears 120, the second plurality of gears 122 and at least one synchronizer 140. The input shaft 110 includes a first end 512 for engaging the prime mover (not illustrated) and a second hollow end 514 having an input gear 516 configured on the hollow end 514 and a pocket bearing 518 positioned in the hollow end 514. The pocket bearing 518 is configured to support the main shaft 116 at a forward end 520 and a bearing 524 supports the main shaft 116 at an aft end 522. The geared exterior 516 is configured to engage a forward gear 526 configured on the countershaft 118. The input shaft 110 may be supported in the housing 124 by at least one bearing 528, while the output shaft 112 may be supported in the housing 124 by the pocket bearing 518 and the bearing 524. The counter shaft 112 may be separately supported by a forward bearing 530 and an aft bearing 532 configured in the housing 124. The bearings 518, 524, 528, 530, 532 are not limited to a specific type or size, but may include taper, thrust, roller, ball, needle or other type of known bearing.

The countershaft 118 may also include a forward mid-gear 534, an aft mid-gear 536 and an aft gear 538, all of which may be fixedly connected to the countershaft 118. Thus, the second plurality of gears 122 may include the forward gear 526, the forward mid-gear 534, the aft mid-gear 536 and the aft gear 538, the second plurality of gears 122 may be configured to transmit torque from the input shaft 110 to the first plurality of gears 120, which may include a main forward gear 540, a main mid-gear 542 and a main aft gear 544 rotatively attached to the main shaft 116. The gears 540, 542, 544 may include a roller bearing 546 configured between the gears 540, 542, 544 and the main shaft 116. The roller bearing 546 may be a needle bearing that allows the gears 540, 542, 544 to rotate about the main shaft 116. Thus, the first plurality of gears 120 are in rotative alignment with the countershaft 118 and the second plurality of gears 122. The number of gears used is not limited to a specific set, but determined by the size and design of the transmission. The gears 120, 122 may be of any known gear design and are illustrated as helical gears.

As previously discussed, the plurality of gears 120, 122 transmit torque from the input shaft 110 to the yoke 114 configured on the main shaft 110 at the rear of the transmission 100. Thus, a torque flow path may be defined through an interaction between the input gear 516 meshing with either the forward gear 526, to transmit through the counter shaft 118, or through a gear flange 548 of the synchronizer 140, to transmit directly through the main shaft 110. FIG. 5 illustrates that the rotating assembly 510 is not limited to the number of synchronizers 140 used to transmit that torque, as a forward synchronizer 140' and an aft synchronizer 140" may be included to provide additional torque paths through the counter shaft 118 and the main shaft 116. The synchronizers 140', 140" engage the main shaft 116 through a splined connection. Specifically, the main shaft 116 includes a forward spline 550 and a mid-spline 552 for transmitting the torque from the synchronizers 140', 140" and through the main shaft 116 to ultimately transmit the rotational torque out through the yoke 114. Merely for demonstrational purposes, the general synchronizer 140 will be discussed in greater detail below.

Figure 6:
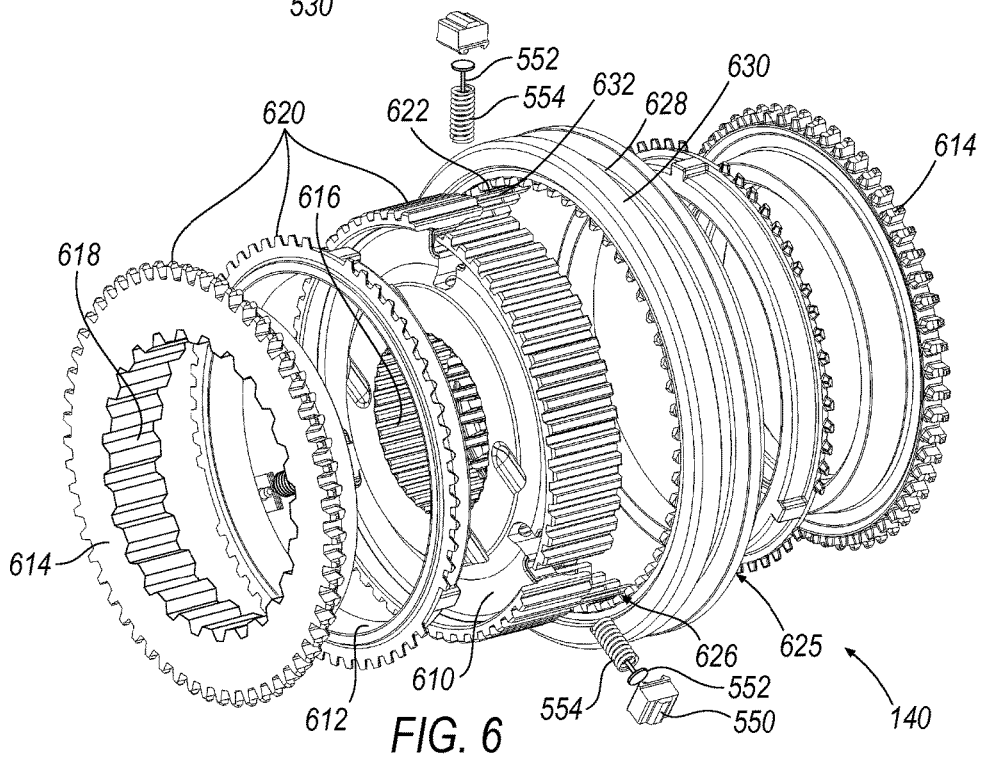
FIG. 6 illustrates an exploded view of an exemplary synchronizer for an exemplary manual compound transmission.

As further illustrated in FIGS. 5-10, the exemplary synchronizer 140 and its operation will now be discussed in greater detail. The synchronizer 140 may be included to provide a smooth transition between the different shift phases and gear selections within the compound manual transmission 100. The synchronizer 140 may be configured to eliminate the "nibble" effect found when changing gears and, which may be felt in the shift lever 134 by the operator. As illustrated in FIG. 6, the synchronizer 140 may include a fixed synchronization hub 610 positioned between two blockers or synchronizing rings 612. The synchronization hub 610 and the synchronizing rings 612 are positioned between two separate gear flanges 614. The gear flanges 614 and the synchronization hub 610 both include internal splines 616, 618. Specifically, the synchronization hub 610 includes the internal splines 616, which are configured to engage at least one of the splines 550, 552 configured on the main shaft 116. The gear flanges 614 include the internal splines 618, which are configured to engage with a corresponding spline cut into an edge of the plurality of gears 120. The splines provide a positive engagement between the rotating components to transmit torque, as previously discussed.

Additionally, the synchronization hub 610, synchronization rings 612 and gear flanges 614 all include external gear teeth 620 or other known drive feature on an outer surface of each. The external gear teeth 620 may be configured to engage corresponding features or internal gear teeth 622 configured on an internal surface of a sliding sleeve 624. The internal gear teeth 622 may be provided on an inner diameter 626 of a sliding sleeve 624, while a circumferential groove 628 may be configured in an outer surface 630 of the sliding sleeve 624 for receiving a portion of the shift fork 138. The sliding sleeve internal gear teeth 622 may be configured to mesh with and be positioned radially about the synchronization hub 610, the synchronization rings 612 and the gear flanges 614. The gear teeth 620, 622 may be configured with reduced radial clearance to improve notchness when the sliding sleeve 624 starts to engage the gear flange 614.

The synchronizer 140 may also include a pre-energizer 640, which may be configured within the synchronization hub 610 for applying additional force during synchronization and engagement. The pre-energizer 640 may include a roller 642, a plunger 644 and a spring 646. The pre-energizer 640 may be received in an aperture 648 or cavity that extends radially inward at a predetermined distance from an outer radial surface of the hub's external gear teeth 620. The pre-energizer 640 may be assembled with the spring 646 inserted into the cavity 648, the plunger 644 may be inserted next and then insertion of the roller 642. The pre-energizer 640 may be retained through the use of a groove or channel 632 configured on the internal diameter 626 of the sliding sleeve 624. The synchronizer components may be constructed from known metallic materials, such as, but not limited to steel, aluminum, titanium, carbon fiber, plastics or other known materials. The gears may be formed during the process of making the components, such as by forming, casting, machining or other known available processes.

Figure 7:
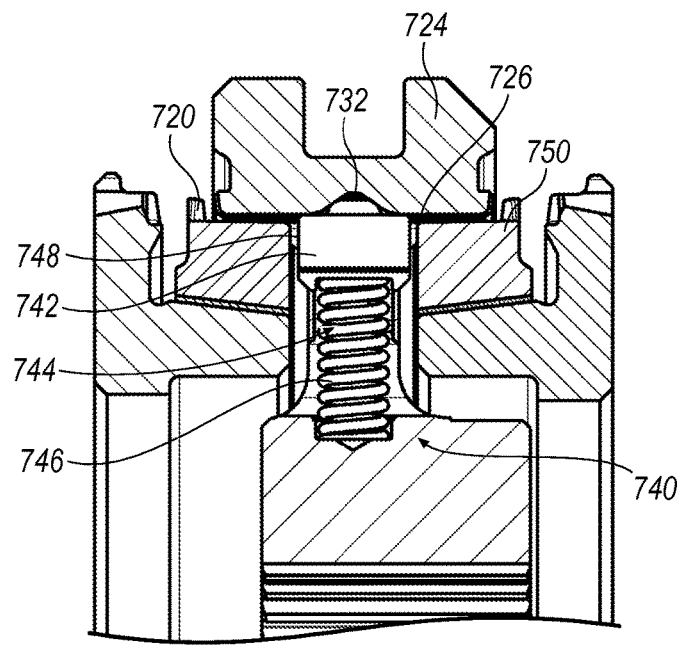
FIG. 7 illustrates a section view of an exemplary pre-energizer having an angled roller element.

FIG. 7 illustrates an exemplary pre-energizer 740. Specifically, the pre-energizer 740 may include an angled roller 742, a plunger 744 and a spring 746. The pre-energizer 740 may be received in an aperture 748 or cavity that extends radially inward at a predetermined distance from an outer radial surface 750 of the hub's external gear teeth 720. The pre-energizer 740 may be assembled with the spring 746 inserted into the cavity 748, the plunger 744 may be inserted next and then insertion of the angled roller 742. The pre-energizer 740 may be retained through the use of a groove or channel 732 configured on the internal diameter 726 of the sliding sleeve 724. The synchronizer components may be constructed from known metallic materials, such as, but not limited to steel, aluminum, titanium, carbon fiber, plastics or other known materials. The gears may be formed during the process of making the components, such as by forming, casting, machining or other known available processes.

Figures 8A, 8B, 8C:
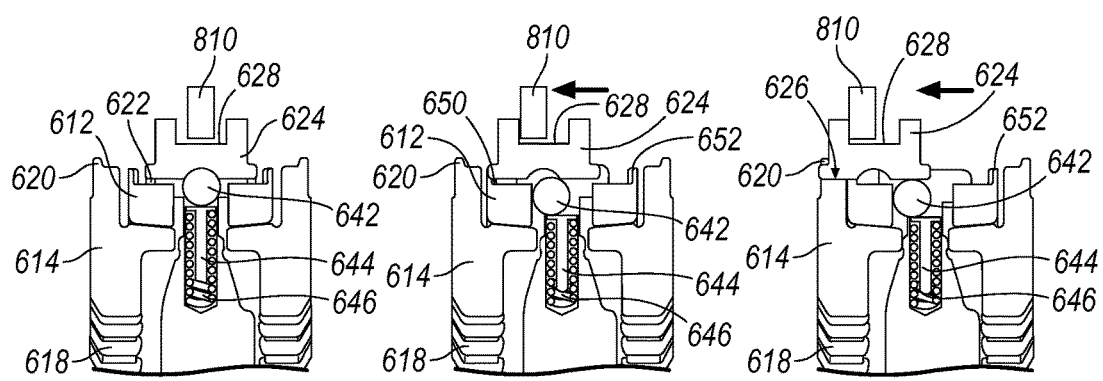
FIG. 8A illustrates a section view of an exemplary pre-energizer and synchronizer in a neutral position.
FIG. 8B illustrates a section view of an exemplary pre-energizer and synchronizer in a synchronizing position.
FIG. 8C illustrates a section view of an exemplary pre-energizer and synchronizer in an engaged position.

FIGS. 8A-8C illustrate an exemplary operation sequence where the shift fork 138 including a shift pad 810, which is positioned within the circumferential groove 628 when fully assembled. The shift pad 810 is generally a plastic or Teflon sleeve that is positioned around a contact surface on the shift fork 138. The shift pad 810 is utilized to prevent friction from preventing the shift fork 138 from moving the sliding sleeve 624. The shift fork 138 and included shift pad 810 may be configured to transmit linear motion from the shift lever 134 to sliding sleeve 624 to allow the synchronizer 140 to select a predetermined gear set, as previously discussed. Specifically, for or aft movement of the shift fork 138 exerts a predetermined force to be transmitted through the gear change control system 136 to be applied to the sliding sleeve 624. Movement of the sliding sleeve 624 initiates the synchronization of the synchronizer 140 and gear engagement. During the synchronization phase the movement of the sleeve typically results in a high level of force being developed, further resulting in one of the damping elements 388, 488 to be fully compressed. However, the improved detent plunger 242 and detent ramp 244 may aid in the reduction of the high level of force by reducing the force from approximately 29 N to approximately 13 N. FIGS. 8B and 8C illustrate this movement of the shift fork 138 to the forward direction, which as the sliding sleeve 624 moves the roller 642, plunger 644 and spring 646 provide resistance, thereby forcing the synchronizing ring 612 against the targeted gear.

Additionally, the synchronizing rings 612 rotate, due to the friction of the rotating assembly 510, until the synchronizing rings 612 meet a wall 650 of the fixed synchronization hub 610. At this position a plurality of engagement chamfers 652 are aligned and the synchronization begins. Once synchronization begins, the compressed damping element 388, 488 suddenly releases the compression, thereby allowing the stored energy to move the damping element 388, 488, which restores the damping element 388, 488 to a system kinetics. The released energy speeds up the sliding sleeve 624 to engage the gears while the speed helps to prevent the nibble associated with the engagement of the gears. Once the sliding sleeve 624 is sped up and synchronization progressed, the synchronization ring 612 and the sliding sleeve 624 are meshed via the chamfers 652 and the external gear teeth 620 on the gear flange 614 are also aligned via the chamfers 652 and fully engaged by the sliding sleeve 624 as it is advanced toward the gear. Once the internal gear teeth 622 come into contact with the gear flange 614 the external gears 620 mesh via the chamfers 652, allowing the sliding sleeve 624 to fully engage the gear flange 614 and start the transfer of torque through that specific gear change.

Referring specifically to FIGS. 9-11, which illustrate and top view of the meshing as discussed above. FIG. 9 illustrates the sliding sleeve 624 at full engagement with the synchronizing ring 612 as the chamfers 652 align the teeth. FIG. 10 illustrates the initial meshing of the sliding sleeve 624 chamfers 652 engaging the chamfers 652 of the gear flange 614 prior to full engagement. FIG. 11 illustrates the full engagement of the sliding sleeve 624 with the gear flange 614 to create a torque path as previously discussed. Disengagement of the synchronizer 140 occurs in the reverse order.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

Reference in the specification to "one example," "an example," "one approach," or "an application" means that a particular feature, structure, or characteristic described in connection with the example is included in at least one example. The phrase "in one example" in various places in the specification does not necessarily refer to the same example each time it appears.

The present disclosure has been particularly shown and described with reference to the foregoing illustrations, which are merely illustrative of the best modes for carrying out the disclosure. It should be understood by those skilled in the art that various alternatives to the illustrations of the disclosure described herein may be employed in practicing the disclosure without departing from the spirit and scope of the disclosure as defined in the following claims. It is intended that the following claims define the scope of the disclosure and that the method and apparatus within the scope of these claims and their equivalents be covered thereby. This description of the disclosure should be understood to include all novel and non-obvious combinations of elements described herein, and claims may be presented in this or a later application to any novel and non-obvious combination of these elements.

Moreover, the foregoing illustrations are illustrative, and no single feature or element is essential to all possible combinations that may be claimed in this or a later application. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A rail selector for use with a compound transmission shift mechanism, comprising:
   a plurality of gears configured on at least one transmission shaft;
   a synchronizer configured on at least two of the plurality of gears;

a control system configured to engage and position the synchronizer into alignment with at least two gears on the transmission shaft;

a damping assembly on the control system and operatively connected to the synchronizer, and configured to translate movement of a shift lever through a shift rail and through shift forks that are configured to engage the synchronizer;

wherein the damping assembly includes a rail selector having wings, operatively connected to the shift forks that extend in a lateral direction from a shaft passing axially through a center of the damping assembly.

2. The rail selector of claim 1, wherein the laterally extending wings include a first laterally extending wing configured on a first side of the damping assembly and a second laterally extending wing configured on a second side of the damping assembly, opposite the first side.

3. The rail selector of claim 1, wherein the control system includes the shift rail operatively connected to the shift forks.

4. The rail selector of claim 1, wherein the control system supports the damping assembly.

5. The rail selector of claim 1, wherein the control system includes at least one adjustment mechanism interconnected to the shift rail.

6. The rail selector of claim 5, wherein the at least one adjustment mechanism includes at least one detent plunger operatively connected to the shift rail through a detent ramp, the adjustment mechanism configured to at least one of minimize or eliminate free play when shifting the compound transmission.

7. The rail selector of claim 6, wherein the detent ramp includes an indented center section with outwardly and inwardly sloped ramps configured forward and aft of the indented center section.

8. The rail selector of claim 6, wherein the detent plunger has a length of approximately 25 mm to 40 mm.

9. The rail selector of claim 1, wherein the damping assembly includes at least one damping element constructed of an absorbing element and configured to absorb movement in at least one of the plurality of gears.

10. The rail selector of claim 1, wherein the synchronizer includes at least one fixed synchronization hub configured between at least two synchronizing rings, which are positioned between two gear flanges.

11. The rail selector of claim 10, wherein the synchronizer includes a pre-energizer configured with at least one of a roller, a plunger and a spring.

12. A transmission shift mechanism, comprising:
two or more gears configured on a transmission shaft;
a synchronizer configured to engage two of the two or more gears; and
a control system including shift forks and a main shift rail damping assembly operatively connected to engage and position the synchronizer into alignment with the two gears, wherein the damping assembly includes a rail selector having laterally extending wings operatively connected to the shift forks;
wherein the synchronizer includes a pre-energizer configured with at least one of a roller, a plunger and a spring; and
wherein the synchronizer includes at least one fixed synchronization hub configured between at least two synchronizing rings, which are positioned between two gear flanges.

13. The shift mechanism of claim 12, wherein the laterally extending wings include a first laterally extending wing configured on a first side of the damping assembly and a second laterally extending wing configured on a second side of the damping assembly, opposite the first side.

14. The shift mechanism of claim 12, wherein the control system supports the damping assembly, and the damping system is configured to translate movement of a shift lever through a shift rail and through the shift forks.

15. The shift mechanism of claim 12, the synchronizer further comprising a synchronization ring and a sliding sleeve configured to engage and mesh each other through a plurality of chamfered gears correspondingly configured on each.

16. The shift mechanism of claim 12, the control system further including an adjustment mechanism interconnected to at least one of a plurality of shift rails.

17. The shift mechanism of claim 16, wherein the adjustment mechanism includes a detent plunger operatively connected to a main shift rail through a detent ramp, the adjustment mechanism configured to at least one of minimize and eliminate a free play when shifting a compound transmission.

18. The shift mechanism of claim 17, wherein the detent ramp includes an indented center section with outwardly and inwardly sloped ramps configured forward and aft of the indented center section.

19. The shift mechanism of claim 17, wherein the detent plunger has a length of approximately 30 mm to 35 mm.

20. The shift mechanism of claim 17, wherein the control system is configured to engage and position the synchronizer into the alignment.

* * * * *